United States Patent [19]

Murrell

[11] Patent Number: 4,657,364
[45] Date of Patent: Apr. 14, 1987

[54] EYEWEAR RETAINER

[76] Inventor: Edmond E. Murrell, 2204 NE. 87th Ave., Vancouver, Wash. 98662

[21] Appl. No.: 775,510

[22] Filed: Sep. 12, 1985

[51] Int. Cl.[4] ................................................ G02C 3/02
[52] U.S. Cl. ..................................... 351/156; 351/123
[58] Field of Search ................ 351/155, 156, 157, 123

[56] References Cited

U.S. PATENT DOCUMENTS 4,133,604  1/1979  Fuller .................................... 351/123
4,479,703  10/1984  Enghofer ............................. 351/156
4,549,793  10/1985  Yoon .................................... 351/156

*Primary Examiner*—Rodney B. Bovernick
*Assistant Examiner*—P. M. Dzierzynski
*Attorney, Agent, or Firm*—Chernoff, Vilhauer, McClung & Stenzel

[57] ABSTRACT

An adjustable eyewear retainer of fabric-covered elastic form material, for holding eyeglasses and the like securely in place on a wearer's head, providing padding for the bow portions of the eyeglasses which fit behind the wearer's ears. A pair of tubular members, which fit over the downwardly curved bows of a pair of glasses, are attached to the respective forward ends of a pair of elastic straps at an acute angle. Mating pieces of hook-and-loop fastening material are provided on the rear ends of the straps to provide for adjustable fit and easy removal of the glasses as desired. Parts of the tubular members are lined with fabric, while a short rear end part of each tubular member may have a rubber-like inner surface to provide increased grip on the bows of a pair of glasses. Adhesive construction is used.

11 Claims, 7 Drawing Figures

EYEWEAR RETAINER

BACKGROUND OF THE INVENTION

The present invention relates to devices for holding eyeglasses and the like securely in place on a wearer's head, as during athletic exercise, and particularly to such a device which is adjustable and permits removal of the glasses from the wearer's head without the device having to be removed from the glasses.

Various devices have been used in the past to hold eyeglasses and other eye protective items in place more securely than is normally done simply by the bows of the eyeglasses. The previously-known devices for this purpose, however, suffer from certain shortcomings.

For example, Enghofer U.S. Pat. No. 4,479,703 discloses eyeglass frames having included elastic cords which may be extended from the rearmost ends of the bows. The elastic cords include devices for connecting their exposed ends together. The Enghofer device, however, is not readily adaptable to existing eyeglass frames.

Other known devices include a strap having end portions which may be attached to the temples of ordinary eyeglass frames to retain the eyeglasses on a wearer's head. Adjustability of most such devices is provided by sliding the forward ends of such devices to an appropriate position along the temples of the glasses frames. Adjustment in this fashion is not particularly secure, and such devices do not permit easy removal of the glasses from the wearer's head.

As one example of such devices, Fuller U.S. Pat. No. 4,133,604 discloses an eyeglass retainer comprising an elastic strap having tubular end portions formed by sewing together opposite edges of the terminal portions of the strap. These tubular portions are slipped over the ends of the bows and placed on the straight horizontal temples of a pair of glasses, where they are not particularly attractive in appearance, and add bulk to the temples, possibly pressing against the wearer's head. This device must be adjusted by sliding the tubular portions to an appropriate position along the temples. There is no provision for removal of the glasses from the wearer's head without sliding the tubular portions rearwardly along the temples of the glasses. Unless one portion of the device is removed from the bow of a pair of glasses, any cap or hat must be removed to permit a user to remove his glasses.

What is desired, therefore, is an improved device for retaining eyewear, which is secure and comfortable, is adjustable to fit the wearer's head, which does not require removal of the device from the eyewear or removal of a user's cap in order to remove the eyewear from the wearer's head, and which is useful with conventional eyeglasses and the like.

SUMMARY OF THE INVENTION

The present invention provides a snug and comfortable eyewear retainer which overcomes the aforementioned shortcomings and disadvantages of the previously known devices for retaining eyewear on a wearer's head. According to the present invention, each end of an elastic strap of a strong, soft material such as rubber of the type used in surgical tubing, or cloth-covered neoprene foam of the type frequently used for underwater divers' wet suits, is attached to a curved tube made of the same elastic material, oriented at an acute angle to the length of the strap. The curved tubes extend downward and rearward beneath the respective ends of the strap, elastically gripping the ends of the bows of the eyewear. The strap includes two overlapping parts which are adjustably held together, as by pieces of hook-and-pile fastening material of a type such as that marketed under the registered trademark Velcro. Since the pieces of fastening material are easily separated and mated, it is very easy to adjust the eyewear retainer of the present invention to hold a pair of glasses snugly and comfortably. Separating the strap portions permits removal of eyewear without removal of a cap or protective hat. The strap portions can also be matingly connected with a great enough length to permit a pair of glasses to be worn suspended securely from a wearer's neck, if desired.

In a preferred embodiment of the invention, the curved tubes are made by adhesively joining a pair of opposite edges of a narrow rectangular or trapezoidal piece of foam material. The tubes are similarly adhesively attached to the straps. Preferably the tubes are arcuately curved along their lengths, and the front end of each strap portion is also arcuately curved to provide a forward and downwardly facing concave mating surface.

A preferred material for the strap and the tubes is neoprene foam covered by an adhesively attached layer of fabric, for example, a nylon knitted fabric. In a preferred embodiment of the invention, a short portion of each tube, near the lower rear end thereof, may be of foam having an exposed neoprene inner surface to provide an improved ability to grip the bows of a pair of glasses.

Preferably, the strap is attached to each of the tubular portions at such an angle that the strap, in a relaxed state, extends rearwardly, generally in line with the straight horizontal temple portions of a pair of glasses, when the tube is installed surrounding the downwardly-curving bow. The tubular portions provide cushioning of the bows, in the space between the wearer's ears and the side of the head, but do not extend onto the straight, generally horizontal temples of a pair of glasses to any significant extent.

It is therefore a principal object of the present invention to provide an improved eyewear retainer which is capable of holding eyewear more snugly and comfortably than is done by previously available retainers.

It is another important object of the present invention to provide an eyewear retainer which is easily adjustable to provide a comfortable fit and which need not be removed from eyewear in order to permit removal of the eyewear from the wearer's head, even when a hat is worn.

It is yet a further object of the present invention to provide an eyewear retainer which is easily, yet securely attached to the eyewear.

It is a principal feature of the present invention that it includes curved tubular portions attached to the front ends of elastic strap portions of the retainer at an angle permitting the tubular portions to fit on the downwardly-curved bows of a pair of eyeglasses, while the strap extends rearwardly beyond the bows, so that the bows are provided with a cushioning layer which helps to provide a snug, secure, and comfortable fit.

It is another important feature of one embodiment of the present invention that each of the curved tubular portions includes at least a short length of exposed rubber-like material as its interior surface at its lower, rear, end, to help retain the tubular portion in the desired position on the bows of a pair of glasses.

It is a further feature of the present invention that it includes hook-and-loop fastening material permitting the strap portions to be adjustably mated to one another, yet permitting them to be separated easily to permit removal of the eyewear from the wearer's head.

It is a principal advantage of the eyewear retainer of the present invention that it is more convenient to use than previously known eyewear retainers.

It is another advantage of the present invention that it provides an eyewear retainer which is more comfortable than previously known eyewear retainers.

The foregoing and other objectives, features, and advantages of the present invention will be more readily understood upon consideration of the following detailed description of the invention taken in conjunction with the accompanying drawings.

DETAILED DESCRIPTION OF THE INVENTION

Figure 1:
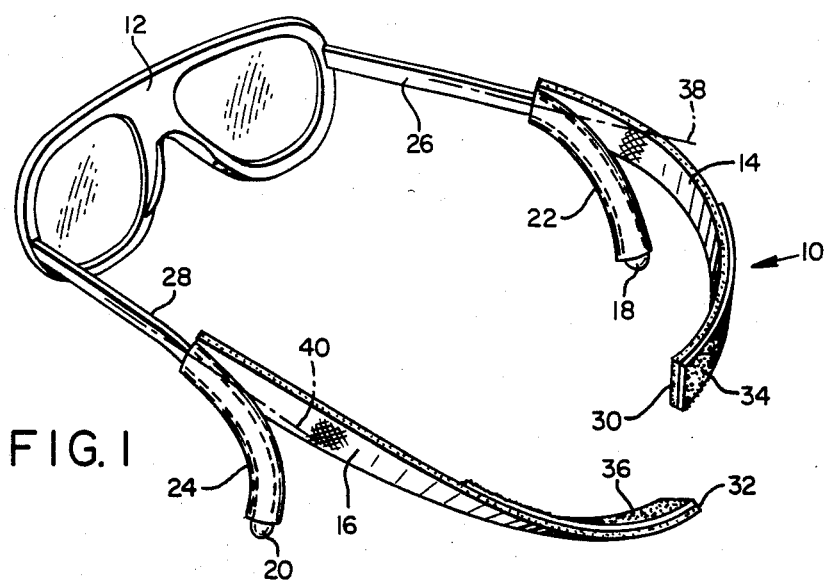
FIG. 1 is a view of a pair of glasses equipped with an eyeglass retainer embodying the present invention.

Referring now to the drawings, an eyewear retainer 10 is shown in FIG. 1 attached to a pair of galsses 12. The eyewear retainer 10 comprises two separate parts, including a first strap member 14 and a second strap member 16. The first strap member 14 is attached to the downwardly curving rear end, or bow, portion 18 on the right side of the frame of the glasses 12, while the second strap member 16 is attached to the corresponding rear end, or bow, portion 20 of the left side of the glasses 12, by respective tubular members 22 and 24 of the eyeglasses retainer 10. The tubular members 22 and 24 are approximately 2 to 3 inches long and fit over the respective bows rearward of the horizontal, substantially straight temple portions 26 and 28 of the glasses 12.

At respective rear ends 30 and 32 of the first and second strap members 14 and 16, mating pieces 34 and 36 of a hook-and-loop fastening material, such as that commonly available under the trademark Velcro, are securely fastened to the strap members so that the rear ends 30 and 32 may be fastened together in overlapping relationship to provide the desired length of the retainer 10 rearward of the bows 18 and 20 of the glasses 12.

Each of the horizontal temple portions 26 and 28 of the glasses 12 defines generally a respective temple axis 38 or 40. As may be seen in FIGS. 2 and 3 each of the strap members 14 and 16 includes a respective top margin 42 or 44, and a respective bottom margin 46 or 48. When the retainer 10 is attached to the pair of glasses 12 the respective strap member 14 or 16, in a relaxed configuration, extends generally along a rearward extension of the respective temple axis 38 or 40, although the strap members may be elastically stretched to a position somewhat below the temple axes, in order to conform to the shape of the rear of a wearer's head, at some distance away from the respective bow 18 or 20, as shown in broken line in FIGS. 2 and 3.

Figure 2:
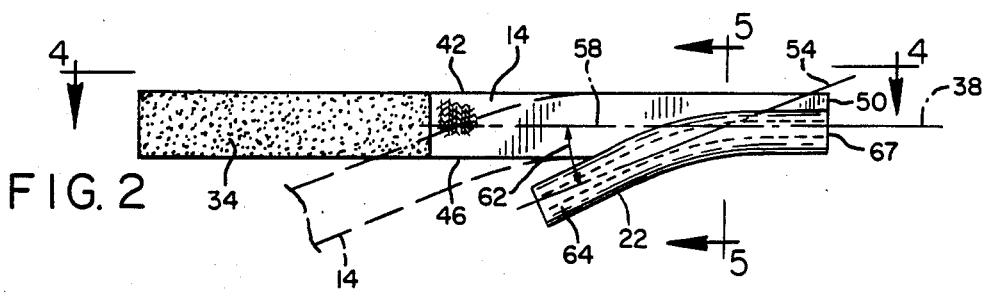
FIG. 2 is a side elevational view of one half of the eyeglass retainer shown in FIG. 1.
Figure 3:
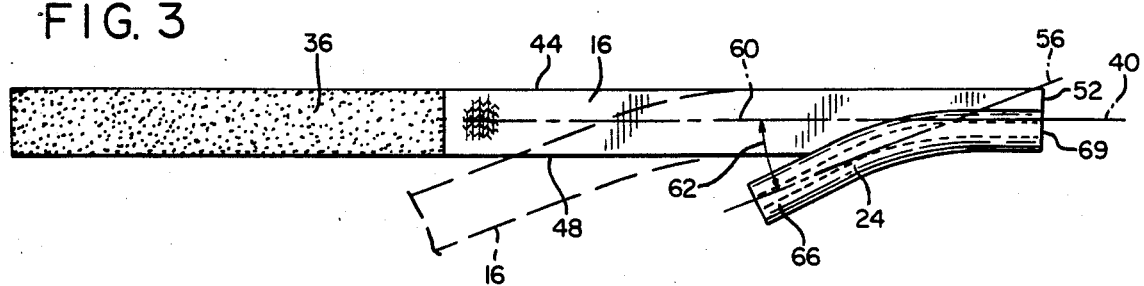
FIG. 3 is a side elevational view of the other half of the eyeglass retainer shown in FIG. 1.

Preferably, as shown in FIGS. 2 and 3, the tubular members 22 and 24 are arcuately curved, but extend generally diagonally with respect to the front ends 50 and 52 of the strap members 14 and 16, roughly defining respective tube axes 54 and 56, which extend diagonally forward and upward with respect to the strap members 14 and 16, as shown in FIGS. 2 and 3. Medially located longitudinal axes 58 and 60 of the strap members 14 and 16 intersect the tube axes 54 and 56, respectively, defining in each case an angle 62 in the range of 20°–60° and preferably about 35°–50°.

Each strap member 14 and 16 is connected to the respective tube at a location where about one-half or more of the strap member is above the respective temple axis 38 or 40 when the retainer 10 is mounted on a pair of glasses 12. Thus, the bore defined within each tubular member does not extend above the medial longitudinal axis 58 or 60 of the respective strap member. This location of the connection between the strap members and tubular members maximizes the force which can be exerted rearwardly on the glasses by exerting tension on the strap members, while minimizing the downward component of the force tending to slide the tubular members 22 and 24 along the bows 18 and 20 in response to rearward tension in the strap members. Such a downward force is undesirable, as it might cause the tubular members 22 and 24 to slide downwardly along the bows 18 and 20 when the eyeglass retainer 10 is used. However, the strap members 14 and 16 stretch elastically to bend downwardly in conforming to the back of a wearer's head as indicated by broken line outline in FIGS. 2 and 3. A small force developed in this manner tends to reduce the downward pressure of the eyewear on the bridge of a wearer's nose, adding to the comfort of the eyewear retainer 10.

Figure 5:
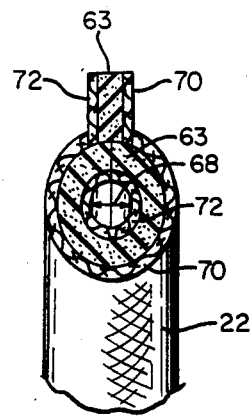
FIG. 5 is a sectional view, taken along the line 5—5, of a portion of the eyewear retainer shown in FIG. 2.
Figure 4:
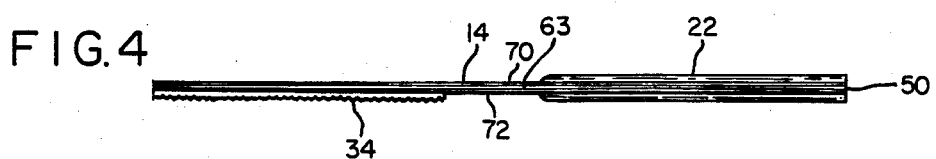
FIG. 4 is a top plan view, taken along the line 4—4, of the half of the eyewear retainer shown in FIG. 2.

The retainer 10 embodying the present invention is designed to fit snugly and elastically on the downwardly curving bows 18 and 20 of the pair of glasses 12. Both the strap members 14 and 16 and the tubular members 22 and 24 are made of similar materials. A preferred material is a sheet 63 of elastic, closed cell neoprene foam with small cell size, such as that manufactured by the Rubatex Corporation of Bedford, Va., for construction of divers' wet suits. Preferably a covering of fabric such as knitted Nylon tricot material is adhesively attached as respective layers 70 and 72 on the two opposite major surfaces of such material, as may be seen in FIG. 5. The tubular members 22 and 24 are formed by rolling together the opposite edges of a rectangular piece of such material and adhesively connecting the edges to each other, providing interior and exterior surfaces of fabric. Suitable adhesives, generally toluene-based, are commercially available for fastening such material. Alternatively, the materials may be sewn with thread to form the tubular members 22 and 24 and to attach them and the fastening materials 34 and 36 to the strap portions 14 and 16.

Preferably, the bottom margins 46 and 48 adjacent front end portions 50 and 52 to the front strap members 14 and 16 are shaped to be concavely arcuate, so that the tubular member and the respective front end portions 50 and 52 mate with one another with the tubular members 22 and 24 arcuately curved. An area of neoprene will normally remain exposed on the outside of such a tubular member, and the tubular members are attached to the respective strap members 14 and 16 adhesively, with the desired curvature being obtained, for example, by a curved wire (not shown) located inside the tubular members 22 and 24 during curing of the adhesive joining them to the strap portions 14 and 16.

Lower, or rear portions 64 and 66, respectively, of each of the tubular members 22 and 24 extend rearwardly and downwardly beneath the lower margin 46 or 48 to grip elastically the downwardly curved rear end portions of the bows 18 and 20 of the glasses 12. To this end, the interior diameter 68 of each of the tubular members 22 and 24 is, for example, about ⅜ inch when relaxed, although it may be stretched easily to slide over the rear ends of the bows 18 and 20. Depending on the size of the bows of the glasses for which the retainer 10 is intended, the interior diameter 68 might be as great as ⅜ inch or as small as 1/16 inch.

Since the bows of eyewear are ordinarily flared and flattened to have a maximum size at their extreme ends, the shape of the rear ends 18 and 20 of the bows causes increased tension in the rear portions 64 and 66 which helps to retain the tubular members 22 and 24 in place. Respective front, or upper, ends 67 and 69 of the tubular members preferably extend to the tops of the bows 18 and 20, but need not extend onto the temples 26 and 28.

Since the curved bows 18 and 20 normally rest on and around the wearer's ear, the weight of the eyeglasses 12 may help to hold the tubular members 22 and 24 in place. The tubular members 22 and 24 provide some padding between the ears and the bows 18 and 20 and conform to the shape of the juncture between the back of the wearer's ear and the side of his head. This snug, cushioned fit between the bows 18 and 20, the tubular portions 22 and 24, and the wearer's head, together with the rearward pull which may be exerted by the strap members 14 and 16, retains the eyeglasses 12 more securely on a wearer's head than is accomplished by simply the shape and weight of the bows. Since the strap members 14 and 16 are made of strong, soft, elastic material, they are capable of withstanding a strong pulling force while still comfortably conforming to the wearer's head.

Improved security in holding the bows 18 and 20 of a pair of glasses 12 can be obtained by the use of a tubular member 74 (FIGS. 6 and 7), similar to the tubular members 22 and 24, but having a rearmost segment 76 of neoprene or similar foam material having a layer of fabric on only its outer side. The side of the foam material which forms an interior surface 78 within the tubular rearmost segment 76 is thus exposed. The exposed neoprene foam surface 78 has a higher coefficient of friction than the fabric surface 72 of the interior of the tubular members 22 and 24 and the fabric layer of the interior of the forward portion of the tubular member 74, shown in FIG. 6. This neoprene surface 78 thus provides additional resistance against the tubular member 74 sliding rearwardly off the bows of a pair of glasses. Preferably, the rearmost segment 76 is only a short portion of the length of the tubular member 74, being, for example, ⅛ inch to ½ inch long, while the entire tubular member 74 is approximately 2 to 3 inches long. It is also acceptable to provide the tubular members with their entire interior surfaces of exposed rubber-like material, although it may be desirable to use an appropriately different tube interior size, or to use material such as talcum powder to lubricate the interior of the tubular members to facilitate attaching them to the bows of eyewear.

Figure 6:
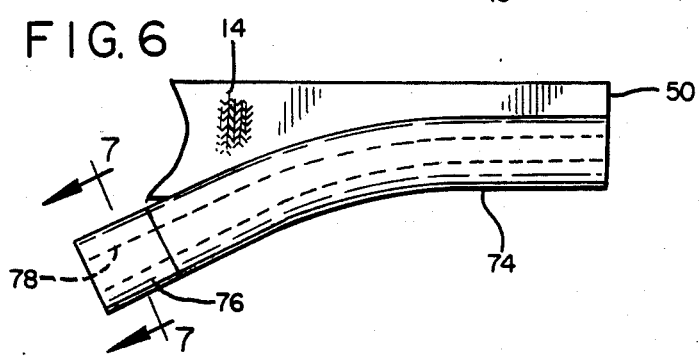
FIG. 6 is a side elevational view similar to that of FIG. 2, showing an alternative embodiment of the tubular member of the eyewear retainer shown in FIG. 2.
Figure 7:
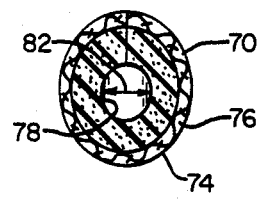
FIG. 7 is a sectional view of the tubular portion of the eyewear retainer shown in FIG. 6, taken along the line 7—7.

Because of the outwardly flared shape of the ends of the bows 18 and 20 of the glasses 12, the rearmost segment 76 may have a slightly larger interior diameter 82 than that of the tubular members 22 and 24, and the tubular member 74 may be made in a complementary tapered configuration, as shown in FIG. 6, to fit better on flared bows of eyewear.

It will be apparent that other soft, elastic materials might also be used in constructing the eyewear retainer of the invention. For example, it would be possible to mold the tubular members and strap portions integrally of a suitable rubber, such as that used in surgical tubing, although such material would not provide the buoyancy of neoprene foam.

Additionally, other fasteners could be used instead of hook-and-pile fasteners. For example, molded plastic side-release buckle sets or similar buckles (not shown) which include flexible plastic latches would be satisfactory in appropriately small sizes. Such buckles are available from Illinois Tool Works, Inc., of Des Plains, Ill.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A retainer for holding eyewear including a pair of side members, each including a bow at the rear end thereof, securely in place on a person's head, comprising:
   (a) first and second elongate elastic strap members, each having a front end, a rear end, a top margin and a bottom margin, and each defining a respective longitudinal axis thereof;
   (b) a pair of elastic tubular members each adapted to extend surroundingly along a respective bow of said eyewear and defining a tube axis and each tubular member being attached to a respective one of said strap members adjacent said front end thereof, the respective tube axis of each tube defining a predetermined acute angle with respect to the longitudinal axis of the respective one of said strap members and each tubular member having a lower end extending rearwardly and downwardly beneath said bottom margin of said respective one of said strap members; and
   (c) first and second mating pieces of hook-and-loop fastening material each attached to the rear end of a respective one of said strap members so as to hold said rear ends selectively and adjustably together with an optional amount of overlapping of each relative to the other so as to provide a desired amount of tension in said strap members to retain said eyewear.

2. The eyewear retainer of claim 1, wherein each of said elastic tubular members is arcuately curved.

3. The eyewear retainer of claim 2 wherein each of said tubular members defines an interior surface, at least a majority of which is of a rubber-like material.

4. The eyewear retainer of claim 2 wherein each of said tubular members defines a respective interior surface and is of elastically resilient rubber-like foam material having attached thereto a layer of textile fabric forming the majority of said interior surface thereof, said interior surface of a rearmost lower end segment of said tube being free of fabric over a predetermined length thereof.

5. The eyewear retainer of claim 4 wherein said predetermined length is in the range of ⅛ inch to ½ inch.

6. The eyewear retainer of claim 1 wherein said tubular members are formed of resilient foam sheet material rolled into tubular form and having respective opposite margins thereof adhesively joined together, each of said tubular members being adhesively connected with a respective one of said strap members.

7. The eyewear retainer of claim 1 wherein said predetermined angle is between 20° and 60°.

8. The eyewear retainer of claim 1 wherein said tubular member has an internal diameter sufficiently small that elastic stretching of said tubular member is required in order to slide said tubular member onto a rearmost portion of a bow of eyewear to be retained.

9. The eyewear retainer of claim 1 wherein each of said tubular members has an internal diameter, when relaxed, of at least 1/16 inch, but no more than ⅜ inch.

10. The eyewear of claim 1 including a lining of textile fabric inside said tubular member over a majority of the length thereof, and including a rear end portion of said tubular member which has an exposed inner surface of foam-rubber-like material.

11. The eyewear retainer of claim 1 wherein said longitudinal axis of each of said strap members is located medially between said top and bottom margins thereof, each of said tubular members having an interior bore, and each said strap member being attached to a respective one of said tubular members so that said bore is located no higher than said longitudinal axis.

* * * * *